Dec. 28, 1965　　　M. GILVAR ETAL　　　3,225,704
TRANSPORTATION SYSTEMS
Original Filed Dec. 18, 1961　　　6 Sheets-Sheet 1

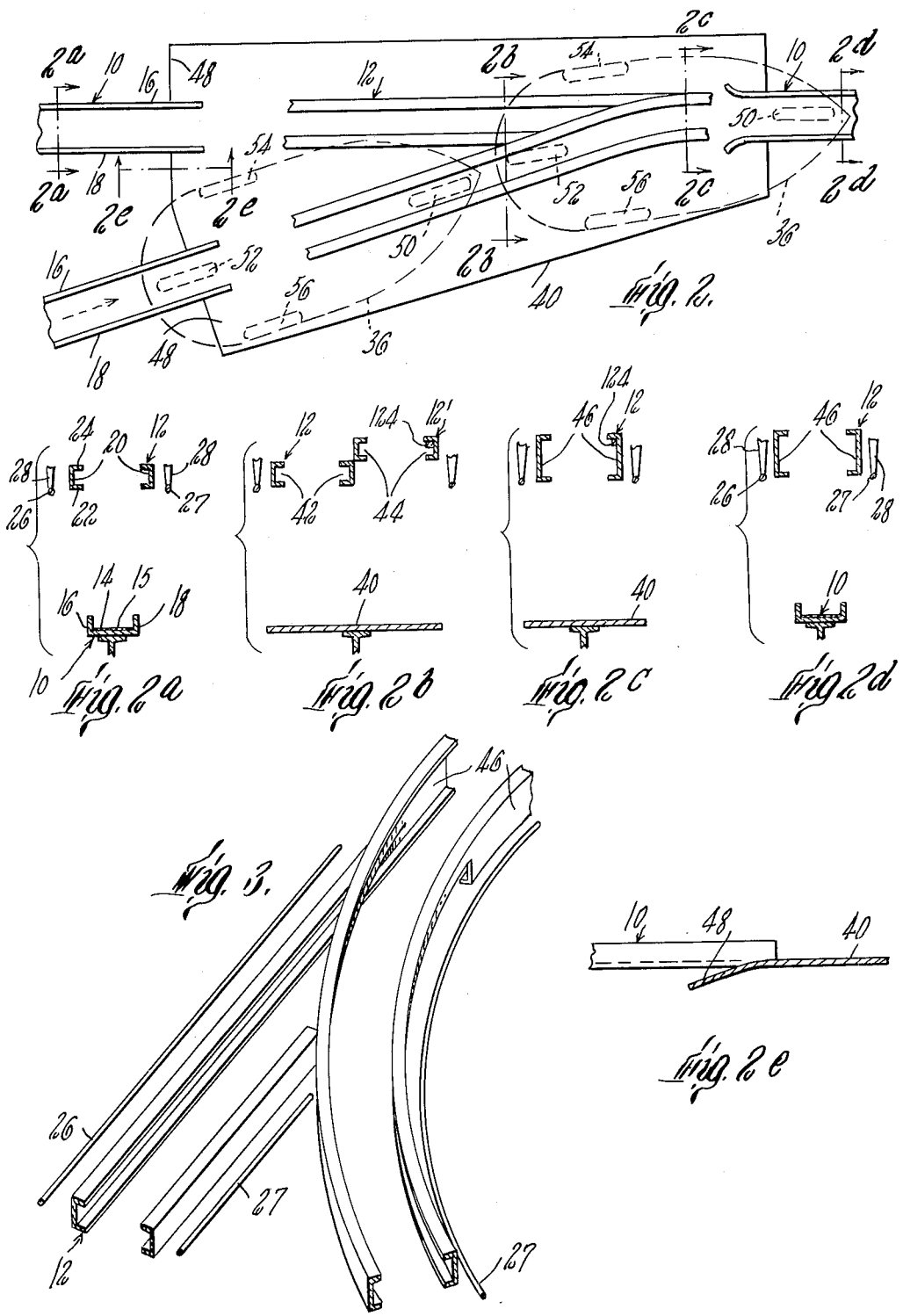

Dec. 28, 1965     M. GILVAR ETAL     3,225,704
TRANSPORTATION SYSTEMS
Original Filed Dec. 18, 1961     6 Sheets-Sheet 3
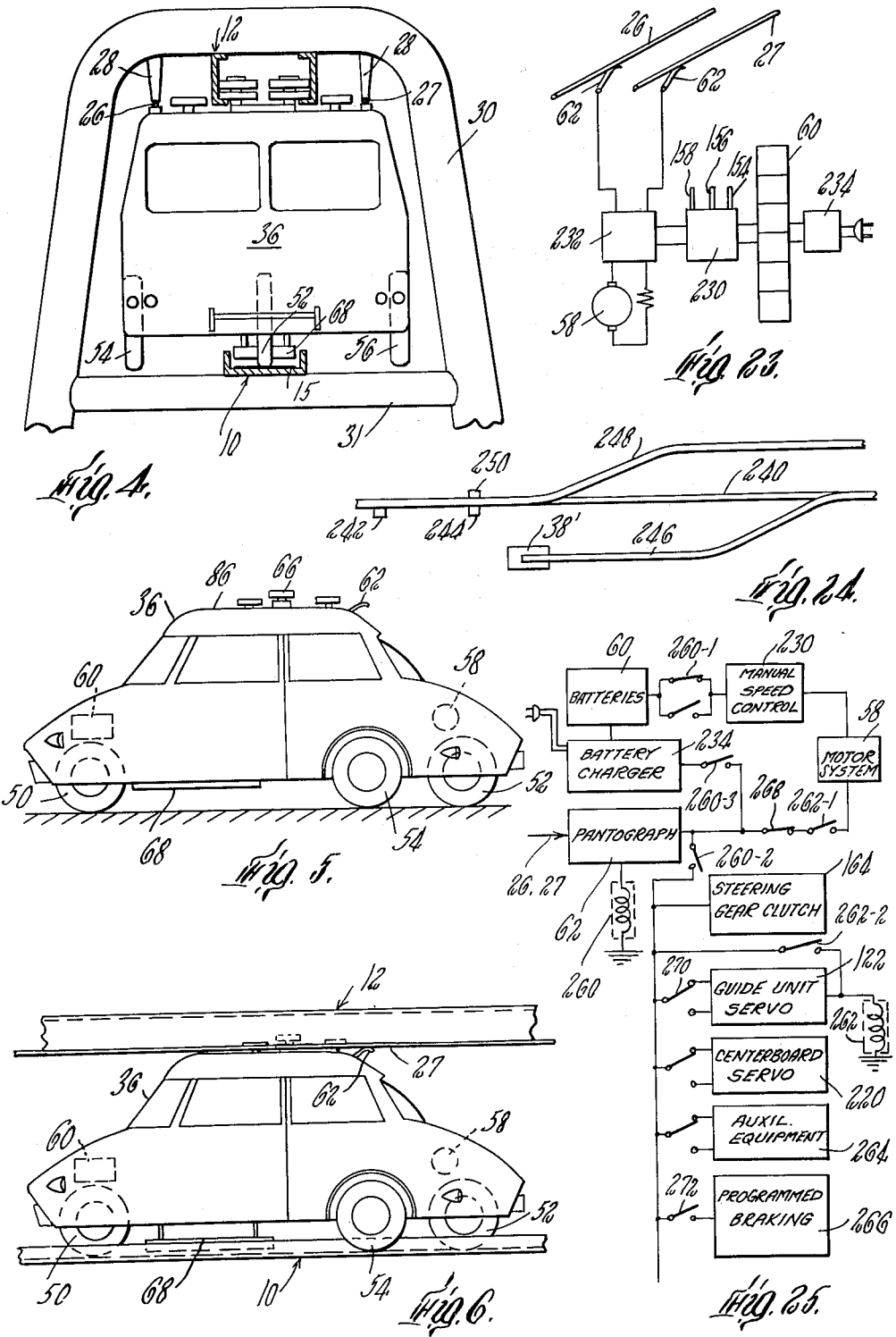

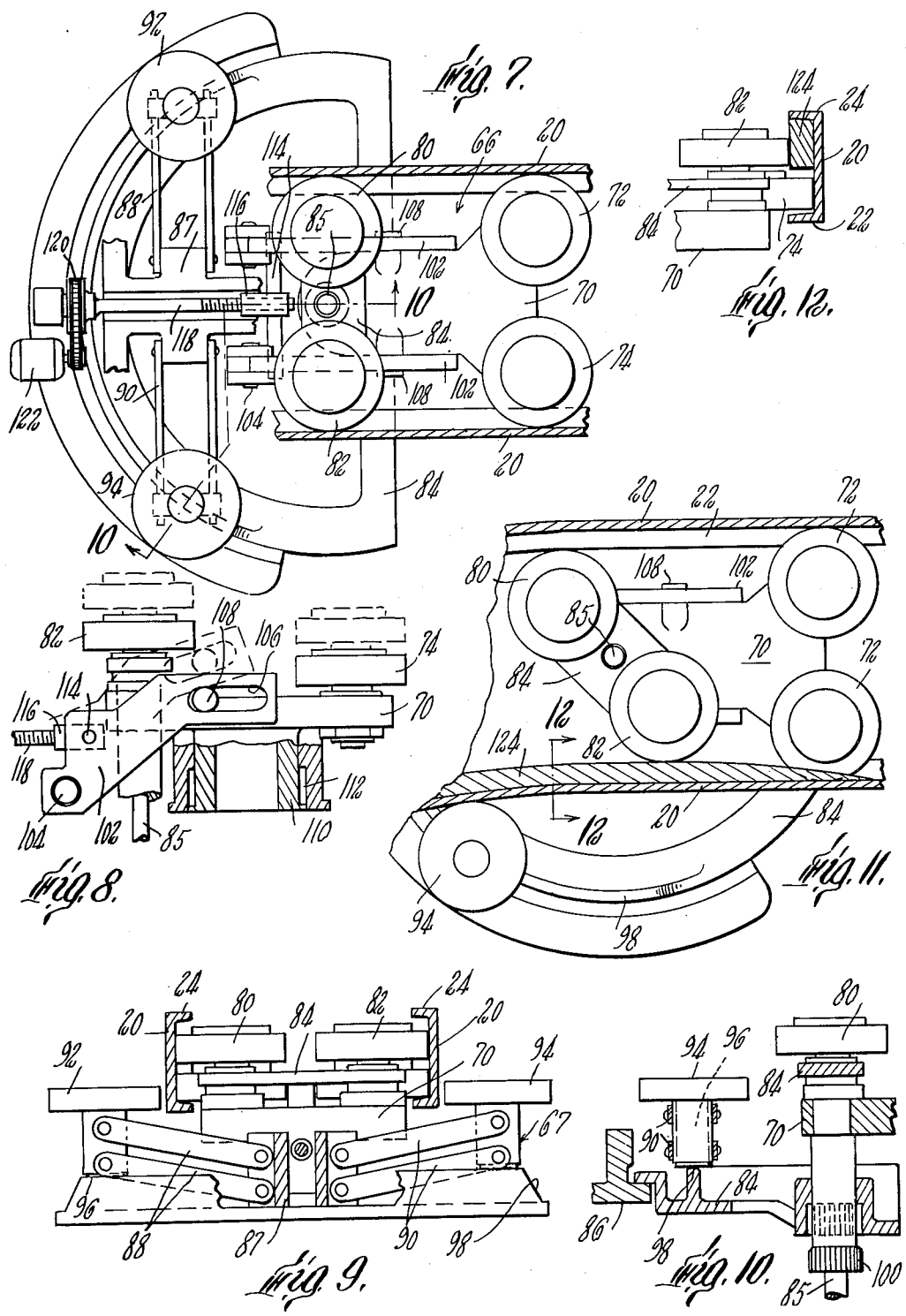

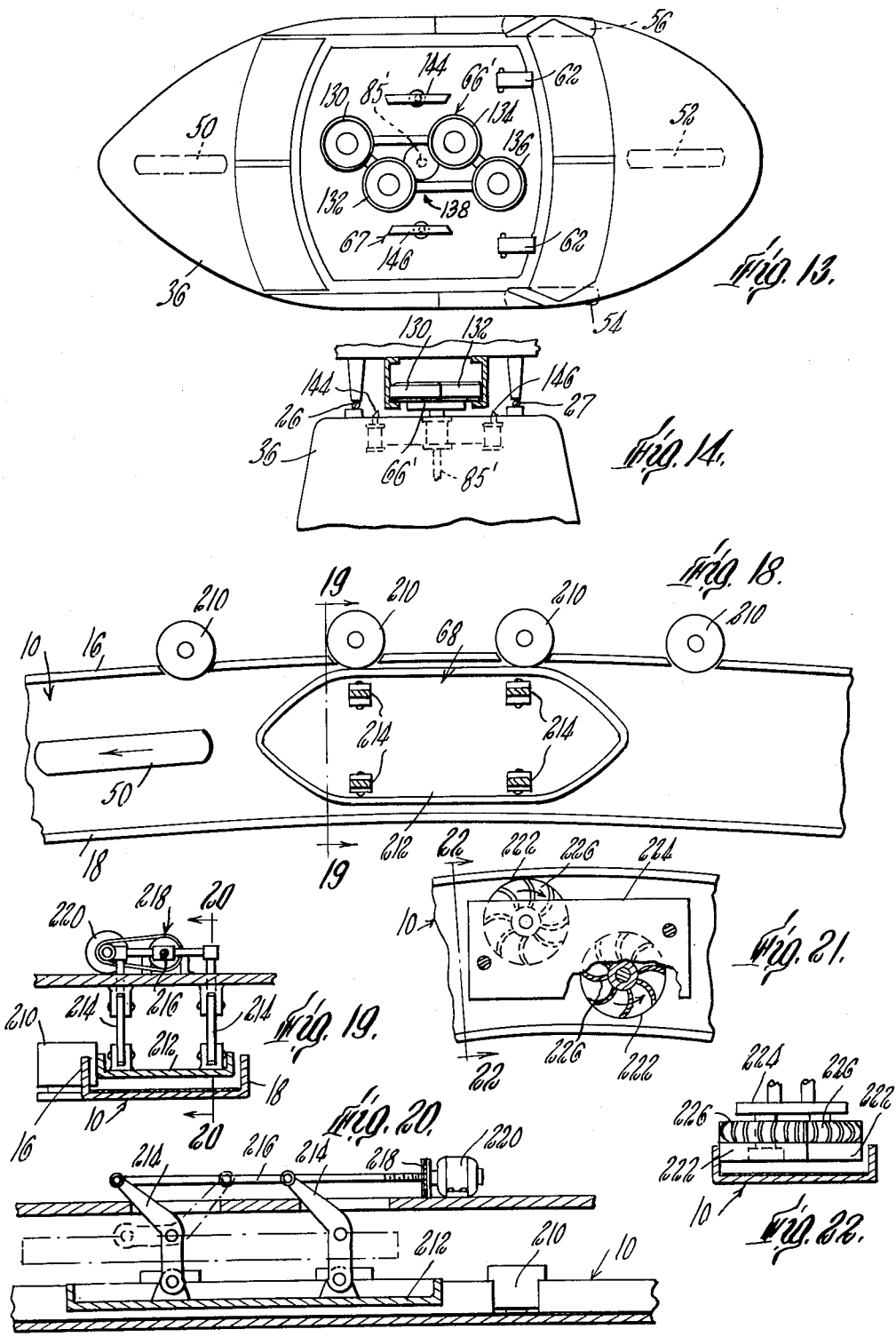

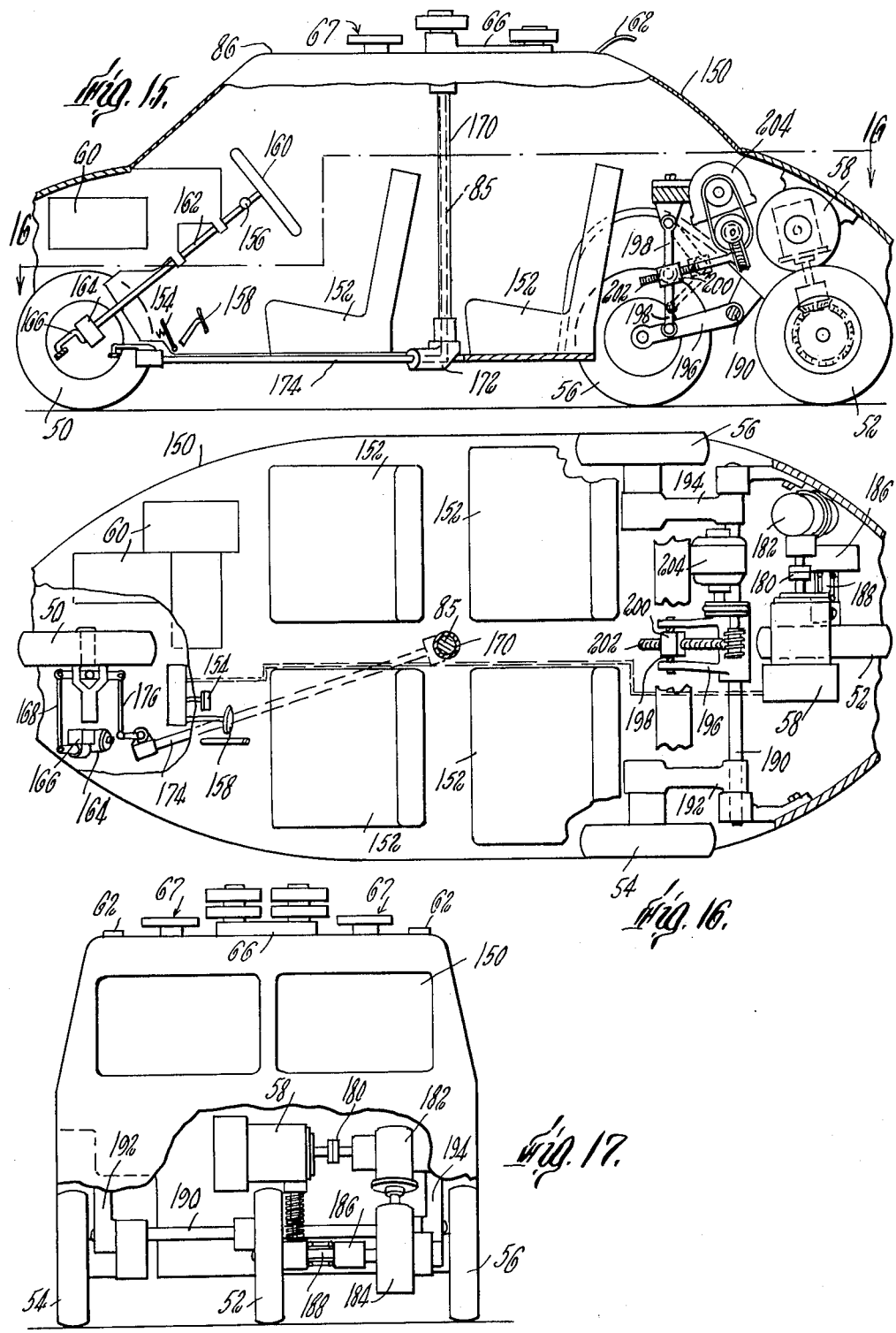

United States Patent Office 3,225,704
Patented Dec. 28, 1965

1

3,225,704
TRANSPORTATION SYSTEMS
Martin Gilvar and William L. Alden, Westboro, Mass., assignors to Alden Self-Transit Systems Corporation, Westboro, Mass., a corporation of Massachusetts
Original application Dec. 18, 1961, Ser. No. 159,930. Divided and this application July 16, 1964, Ser. No. 383,008
14 Claims. (Cl. 104—121)

This invention relates to transportation systems and to vehicles useful on such systems. This application is a division of our copending application Serial No. 159,930, filed Dec. 18, 1961.

Considerable concern exists as to the adequacy of mass transportation systems presently employed in metropolitan areas. Automobile highway systems, the present most commonly used transportation medium, while offering great convenience through the use of personal vehicles, have major disadvantages in terms of construction expense, the amount of land required (both from cost and aesthetic viewpoints), the lower passenger density on the highways as compared with other transportation systems, automobile parking problems in the metropolitan areas, and air pollution caused by the presently used vehicles. Conventional rail systems apparently do not provide an adequate solution and many are in financial difficulty. Among the various systems that have been proposed are monorail systems which employ large multipassenger vehicles either supported on or suspended from a rail system. While such systems employ technological advances and reduce right of way costs, they involve many of the limitations of conventional railroad systems including the necessity of spaced stations to embark and debark passengers which limits the overall speed to which the vehicles can operate; relatively high initial and operating costs; rail complexities as in switching arrangements; and high cost of the vehicles, both initially and in storage and maintenance. Other proposed systems include the automatic control of automobiles as by means of a guidance system embedded beneath the surface of the pavement; systems utilizing compressed air supported vehicles; modified vehicle propulsion techniques; and commuter type rail transport systems for automobiles. The complexity, the resulting unreliability, and apparent great cost of the systems proposed to accommodate conventional automobiles, trucks and busses perhaps limits their usefulness.

It is a general object of this invention to provide a novel and improved transportation system which may be advantageously employed both in commuting environments adjacent metropolitan areas for example and also in high speed longer distance transportation environments.

Another object of the invention is to provide a transportation system which enables integration of private vehicles such as may be driven on highways in conventional manner into a high density controlled transportation system.

A further object of the invention is to provide an improved vehicle control system which facilitates high speed switching of individual vehicles between lines of the system.

Still another object of the invention is to provide a novel form of vehicle arranged for conventional private manual control on highways and for automatic control in a high density transportation system.

The transportation system constructed in accordance with principles of the invention employs an arrangement of a drive surface and a guide and switching control unit extending parallel to and spaced from the drive surface. The vehicles employed in a preferred embodiment of the system are relatively small two or four passenger vehicles for example, which are electrically powered and are arranged to permit manual control (suitable for conventional driving on highways) and automatic control (used when the vehicle is in the transportation system). Control is automatically transferred at the point that the vehicles enter the transportation system and power is supplied to the vehicle by the system while the vehicle is on the system. An adjustable guide mechanism in the vehicle cooperates with the control unit to guide and switch the vehicle in accordance with the position of the guide mehanism.

The invention provides a private vehicle system in which individual manually controlled vehicles may be incorporated into an automatically controlled high density transportation system. The system enables high speed, controlled movement of vehicles and may be employed in elevated rail configurations similar to monorail proposals in a form which employs lighter duty track structures than existing or proposed railroad or monorail systems due to a lower wheel loading factor. The system utilizes electric power and, with its minimal right of way costs and reduction of required labor, the system is comparatively inexpensive both in construction and in operation. In addition, wide use of the preferred form of this type of vehicle will significantly reduce the exhaust fume atmospheric contamination problem associated with the internal combustion engine. The invention provides a supervisable transportation system that is flexible to accommodate both commuting traffic as well as long distance traffic with the desirable feature of private vehicles while affording additional advantages in controlled parking and storage arrangements.

Other objects, features and advantages of the invention will be seen as the following description of preferred embodiments thereof progresses in conjunction with the drawings, in which:

FIG. 2 is a plan view of one embodiment of a rail junction employed in the transportation system illustrating features of the stabilizing platform associated with the drive rail unit and the junction portion of the guide rail unit, the rail extensions of the guide rail unit corresponding to the illustrated drive rail portions not being shown;

Figure 1:
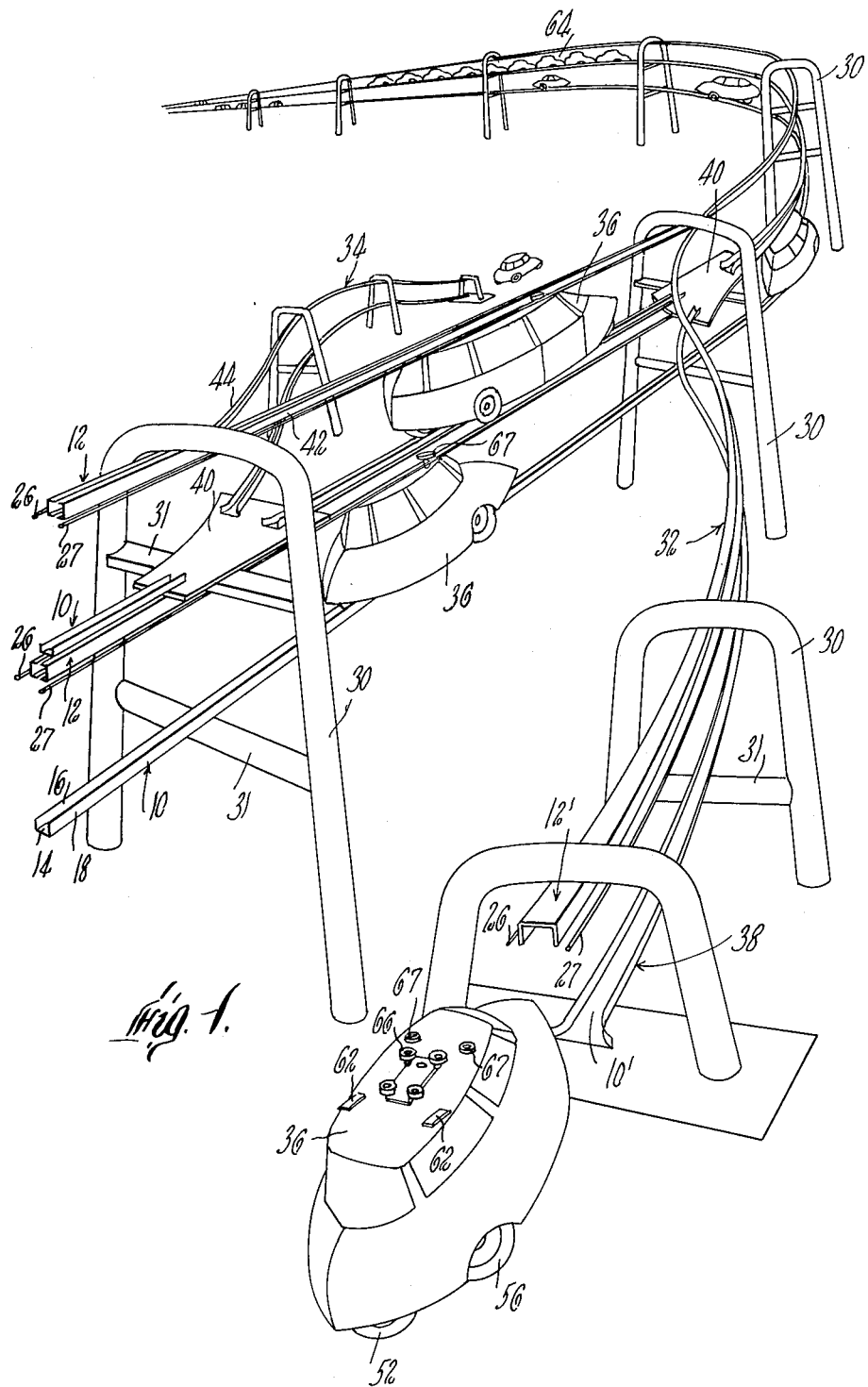
FIG. 1 is a diagrammatic view of a portion of a transportation system constructed in accordance with principles of the invention illustrating certain features thereof.

FIGS. 2a, 2b, 2c, 2d, and 2e are sectional views through portions of the rail junction taken along the lines 2a, 2b, 2c, 2d and 2e of FIG. 2 respectively;

FIG. 3 is a perspective view of a guide rail junction illustrating certain features thereof;

FIG. 4 is an end view of a vehicle on a rail system with its control mechanism engaged with the guide rail unit;

FIG. 5 is a side elevational view of a vehicle constructed in accordance with principles of the invention illustrated on an ordinary highway;

FIG. 6 is a similar side view of the vehicle shown in FIG. 5 in position on a rail system constructed in accordance with principles of the invention;

FIG. 7 is a top view of one form of guide unit employed with vehicles constructed in accordance with the invention;

FIG. 8 is a side view of the guide unit shown in FIG. 7;

FIG. 9 is a front view of the guide unit shown in FIG. 7 with parts thereof broken away;

FIG. 10 is a sectional view taken along the line 10—10 of FIG. 7;

FIG. 11 is a top view of the guide unit similar to FIG. 7 with the steering wheels in rotated position;

FIG. 12 is a sectional view taken along the line 12—12 of FIG. 11;

FIG. 13 is a top view of a vehicle showing a second form of guide structure and auxiliary stabilizing elements;

FIG. 14 is an end view of the guide unit and the auxiliary stabilizing element configuration shown in FIG. 13;

FIG. 15 is a side elevational view through the vehicle shown in FIGS. 4–6 illustrating certain details of the drive and steering mechanism;

FIG. 16 is a sectional view of the vehicle taken along the line 16—16 of FIG. 15;

FIG. 17 is an end view of the vehicle shown in FIG. 15 with certain portions of the vehicle body broken away to better illustrate the drive mechanism;

FIGS. 18–20 are top, end and side views respectively of one form of lateral guide structure that cooperates with the lower rail unit;

FIGS. 21 and 22 are diagrammatic views of a second form of lateral guide structure that cooperates with the lower rail unit;

FIG. 23 is a diagram illustrating features of the electrical control system of the vehicle;

FIG. 24 is a diagram of a portion of the main line track and associated spurs illustrating certain control arrangements; and FIG. 25 is a block schematic diagram of one form of electrical control circuitry.

A portion of a main line of a transportation system constructed according to principles of the invention with associated entrantce and exit spurs is shown in diagrammatic form in FIG. 1. Two superimposed main rail lines are illustrated for travel in opposite directions. As indicated in that figure each rail line includes a lower support and drive rail unit 10 and an upper guide and control rail unit 12. As indicated better in FIGS. 2a–d the lower rail unit is a U-shaped rail having a smooth horizontal surface 14 (which may be paved with suitable asphalt 15 for example to increase the frictional coaction with the vehicle wheels that engage that surface) and two upstanding flanges 16, 18 provided for guide and safety purposes. The upper rail unit 12 consists of two spaced rails each of which includes a vertical guide surface 20 and two inwardly turned spaced flanges 22, 24 respectively. System power supply conductors 26, 27 are supported by insulators 28 on either side of the guide rail unit 12. These rail units 10, 12 of each line are maintained in proper spaced relation by support structures 30 which have horizontal support members 31 to which the rail units are secured. The rail units are disposed generally in vertical relation except at curves at which the lower unit is offset to provide a banked condition.

Also illustrated in FIG. 1 are spur areas 32, 34 each of which includes a lower rail unit 10' and an upper rail unit 12'. Each track spur permits vehicles 36 to enter or exit the system. Entrance portions of the lower rail unit 10 may be initially flared to better receive the vehicle components that cooperate with those rail portions and optionally may be restricted at a subsequent point or "launching area" 38 to provide accurate positioning of the vehicle relative to the guide rail unit 12 at that point.

As indicated in FIGS. 1 and 2, at the rail junction points the flanges 16, 18 of the lower rail unit 10 are omitted and the drive surface 14 is widened into a platform area 40. The upper rail unit 12 melds two different control levels at the junction, a lower level 42 for the main line and an upper (switching) level 44 for the spur line. The upper horizontal flange of level 42 and the lower horizontal flange of level 44 are omitted after the two lines have joined (FIGS. 2c and 2d) to define a single guide rail 46 of double height which permits transition of the vehicle control unit between the higher level and the lower level. This transition is required only at junction points and the control rail unit 12 need be only of the single height indicated in FIGS. 2a and 2b between junction points. As indicated in FIG. 2e the entrance portion of the junction platform 40 may be a depressed apron 48 so the vehicle's entrance is a gradual transition. A perspective view of the guide rail 12 at an entrance junction is shown in FIG. 3 further illustrating the above discussed features.

Perspective views of typical vehicles 36 used on the system are shown in FIG. 1; an end view in FIG. 4; and side views in FIGS. 5 (highway) and 6 (rail). Each vehicle has four foam-filled, rubber tired road wheels which are arranged in these embodiments as follows: a steerable front wheel 50 and a driven back wheel 52 on the axial center line of the vehicle and two side or outrigger wheels 54, 56 which provide lateral support when the vehicle is traveling on the ground independently of the rail system and also while passing through rail junction points on the system. In a modified embodiment the rail junction platforms 40 are omitted and the flanges 16, 18 are not interrupted but are connected together in manner similar to the guide rail units (but without a height transistion). The vehicles employed in such a rail system incorporate a mechanism for elevating the outrigger wheels sufficiently to clear these flanges at the junctions. The vehicle is powered by an electric motor 58 connected to the rear wheel 52 by suitable drive arrangement and a group of storage batteries 60 carried by the vehicle supply power to the motor when the vehicle is on the ground under manual control. (Other vehicle carried power supplies such as fuel cells may be used where advantageous. In certain circumstances it may be desirable to supplement the electric motive power with an internal combustion engine for alternative use.) Suitable current collecting mechanisms 62 such as pantographs, rotatable discs or spring loaded conductor shoes cooperate with power supply conductors 26, 27 associated with the rails. The batteries are switched out of and the collector mechanisms switched into operative circuit relation with the motor when the vehicle is on the rail system. The vehicles may conventionally include auxiliary recharging circuits connectable to domestic electric service for recharging the batteries while the vehicle is not in use and also may include provision for recharging the batteries while the vehicle is receiving power from the system. Other system power supply arrangements for supplying electric power to the vehicles, such as conductor arrangements associated with the lower rail unit 10 also may be used in practicing the invention.

A vertically reciprocable guide unit 66 is supported above the vehicle roof. This guide unit, which may be arranged for relocation into the roof if desired for aesthetic purposes for example, cooperates with the guide rail unit 12 when the vehicle is on the rail system and is connected to the steering wheel 50 to provide a guiding function in addition to providing lateral support. By separating the drive functions of rail unit 10 from the switching and guiding functions of rail unit 12 a system of accurate control is achieved which avoids many complex switching and vehicle spacing problems that are associated with physical rail switching movements. In addition the vehicle spacing on the main line need not be a function of switching rail movement times but rather individual vehicles can be switched out of a train of closely spaced vehicles (indicated in FIG. 1 at 64) while all the vehicles are moving at high speed. This switching arrangement also enables simple but flexible automated parking and storage arrangements. The switching function is accomplished merely by changing the position of the guide mechanism, in the illustrated embodiments by raising the guide unit 66 carried above the roof of the vehicle to a higher level.

Auxiliary vehicle stabilizing components include stabilizing guides 67 which cooperate with the outer surface of the guide rail unit 12; and a "centerboard" structure 68 which is lowered to be disposed between the flanges 16, 18 of the drive rail unit 10 when the vehicle is on the rail system.

One form of the guide unit 66 is shown in FIGS. 7–12. In the configuration a support structure 70 carries a pair of wheels 72, 74 used for providing lateral support which are mounted for rotation about fixed axes on the support base 70. Forward of the lateral support wheels 72, 74 is a pair of steering guide wheels 80, 82 that are mounted on a yoke 84 disposed for rotation on the support structure 70. The yoke is connected to a splined steering link 85. The wheels 80, 82 may be eccentrically mounted on their shafts to permit adjustment for tire wear. It will be noted that the steering guide wheels 80, 82 are mounted at a higher level than the lateral support wheels 72, 74 as indicated in FIG. 8.

Positioned forwardly of the steering guide wheels and fixed to the roof 86 of the vehicle is an upstanding flanged stud 87. Secured to each flange is a parallelogram linkage 88, 90 to the outer end of which is secured a supplementary guide structure 67. Each guide structure includes rotatable wheel members 92, 94 mounted on columnar stub shafts 96, the lower ends of which ride on a camming surface 98 that is engaged with spline 100 for movement with the yoke 84 when the guide unit is in its upper position.

Associated with the guide unit 66 is an elevating mechanism which moves the support base 70 and wheels 72, 74, 80 and 82 from a lower or operating position to an upper or switching position (shown in dotted lines in FIG. 8). The elevating mechanism associated with the guide unit shown in FIGS. 7–12 includes a pair of slotted levers 102 that are mounted for movement about a fixed pivot point 104 secured to the vehicle. Each lever has a slot 106 which receives a pin 108 secured to the support structure 70. The base structure has a rectangular guide surface 110 which cooperates with a correspondingly formed channel 112 in the vehicle and is arranged to permit controlled vertical movement from the position shown in solid lines in FIG. 8 to the position shown in dotted lines in that figure. The slotted levers 102 are connected by a link 114 (best shown in FIG. 7) which carries a nut 116 that cooperates with a threaded shaft 118. The shaft is driven by sprocket and chain mechanism 120 under control of an electric motor 122.

In operation the steering wheels 80, 82 are biased to their normal position as shown in FIG. 7 by suitable spring means. Where the track is curved, as in a curve on the main line or at a switching junction, a vertical cam surface 124 is positioned in the guide rail member on the inside of the curve in the upper portion thereof (as indicated in FIGS. 11 and 12). When the steering wheels 80, 82 engage this cam, they are turned to a position as dictated by the dimensions of the cam to cause a proportioned movement of the coupled shaft 85 which adjusts the steering wheel 50 for guiding the vehicle around the curve.

When the guide unit is raised, this turning of the steering yoke 84 engages spline 100 and also causes a proportioned movement of the camming surface 98 that supports the stabilizing guides 67 so that the supplementary guide wheel 92 or 94 opposite the spur is automatically lowered a distance sufficient to clear the lower edge of flange 22 of the guide rail. This mechanism provides clearance of the supplementary guide at switching junctions as necessary between the main line rail and a spur line rail when the vehicle is being shunted off onto a spur line or the vehicle is entering the main line. The supplementary guide wheel on the inside of the spur remains up to provide support of the vehicle against centrifugal force at that point and to provide support for the vehicle at track junctions where a part of one of the main guide rails is removed to allow a space for the vehicle to pass through. (Both guide wheels remain up whenever the guide unit is in the lower or main line position.) A switching junction of this nature is shown in FIG. 3. Where the spur track melds with the main line track, a portion of the inner guide rail of the main track must be removed to provide access for the guide structure carried by the vehicle. The spur rail guide members provide lateral support for the vehicle moving on the spur but due to the gap in the main line at this point, no lateral support is provided on the main line rail on one side. At this point the auxiliary support wheel 92 or 94 which is carried outside of the main track provides an additional safety feature and prevents excessive lateral displacement of the vehicle as it is passing the short track gap.

A second form of guide unit is shown in FIGS. 13–14. In this guide unit four wheels 130, 132, 134, 136 are each rotatably mounted on a rhomboid structure 138 that is connected to the splined steering shaft 85'. The wheels of this structure are mounted in a plane and they move as a unit to communicate a turning signal in accordance with the configuration of the guide track surface against which they run. In this arrangement the supplementary cam surface 124 is not required. The guide unit is raised as described above for switching functions by mechanical means or other suitable means such as an electrical solenoid actuator commensurate with the type of control structures employed in the vehicle. Where electric solenoid actuators are employed, for example, supplemental guide and support elements 67 in the form of sliders 144 and 146, disposed on either side of the rhomboid structure, may be similarly actuated. These supplemental guide elements are normally retracted and one is raised in response to a suitable actuating switch cooperating with the rail when the guide unit 66' is in the lower position and the vehicle is approaching a rail junction. The raised supplemental guide element is on the opposite side from the spur track (and from the gap in the main line guide surface 20).

In FIGS. 15–17 the vehicle body 150, there illustrated, has two doors and includes conventional windows, and windshields, etc. Four seats 152 are mounted in conventional fashion and suitable control and auxiliary equipment are mounted in the vehicle, including accelerator control 154, reverse control 156, brake control 158 which operates the electric motor plugging and/or dynamic braking system and hydraulic braking system, suitable emergency brake means, lights, horn, instrumentation, rear view mirrors, windshield wipers, and other optional equipment. Mounted within the vehicle body is a steering wheel 160 coupled by a steering shaft 162 and an electrically operated clutch 164 through a steering gear box 166 to a front wheel steering linkage 168 (FIG. 16). This drive steering arrangement includes the clutch as an interlock which disables the manual steering system when the vehicle is on the rail system. The guide unit 66 is connected to shaft 85 which extends through tube 170 and angle gear unit 172 to coupling shaft 174 which is connected to a second steering linkage 176. Movement of the guide unit when the vehicle is on the rail system thus is communicated to the steering wheel 50.

The drive system illustrated includes a seventy-two volt D.C. traction type reversible electric motor 53 which has its output shaft connected by coupling 180 to a spiral mitre box 182 and from that through a gear box 184 and a universal joint 186 to the drive shaft 188 which is connected to the rear drive wheel 52. Other drive arrangements commensurate with the physical size of the components and the available space may be employed driving the rear wheel 52 as desired.

All the wheels are suspended in accordance with the accepted automotive wheel suspension practice. The steering and drive wheels may employ coil spring suspension. Due to the fact that it is desirable to raise the outrigger wheels 54, 56 under certain circumstances (as for example where the platform junction 40 is not employed and the drive rail flanges are melded) a torsion bar system having a torsion bar member 190 is employed from which the wheels 54, 56 are supported by links 192, 194 respectively. At the center of the torsion bar 190 is a lever arm 196, the forward end of which is secured to one end of a toggle linkage 198. The center of the toggle link carries a nut 200 that cooperates with a threaded shaft 202 which is driven by motor 204 to move the linkage between an extended position in which the two links are straight as illustrated in solid lines in FIG. 15 to an outrigger wheel elevated position at which the links are in the position indicated in dotted lines and the outrigger wheels are raised to provide the elevation necessary to clear the drive rail flanges.

Details of certain possible types of auxiliary guide arrangements which cooperate with the lower rail 10 are shown in FIGS. 18–22. In FIGS. 18–20 there is shown a "centerboard" arrangement 68 which is lowered when the vehicle is on the rail system so as to be positioned below the approximate center of gravity of the vehicle. This guide structure is positioned within the upstanding flanges 16, 18 of rail unit 10 and increases the lateral stability particularly when the vehicle is rounding curves. If desired, rollers 210 may be mounted in the outer flange of the track to provide bearing members against which the centerboard structure 68 would bear, thereby reducing friction encountered under such circumstances. The centerboard structure includes a shoe arrangement 212 which is supported by linkages 214. The centerboard is normally carried in a raised position indicated in dotted lines in FIG. 20 when the vehicle is under manual control and is lowered to the operative position by suitable means such as threaded shaft 216 cooperating with nut 218 driven by electric motor 220. Another form of centerboard structure is illustrated in FIGS. 21 and 22 and includes two roller cylinders 222 mounted on a plate 224 which is lowerable and raisable in similar manner to the arrangement shown in FIGURE 20. Scoop structures 226 associated with each roller pick up air causing the roller to rotate in the direction indicated by the arrow in FIG. 21 to provide initial motion and reduce frictional force generated when the roller engages the flange of the rail unit 10.

Each vehicle can be controlled by the driver when the vehicle is on ordinary highways, for example. Power supplied by the batteries 60 carried by the vehicle is applied through a control circuit to the motor 58. A block diagram of the control circuitry is shown in FIG. 23. In that figure there is indicated the acceleration control 154, the reverse control 156 and a brake control 158 connected into a control circuit network indicated by block 230. Power from the batteries is supplied to the motor 58 through the control circuitry 230 and a switching network 232. Acceleration control is accomplished by conventional means, for example, either by switching units of the batteries 60 in and out of circuit to vary the voltage in accordance with the speed required or by inserting resistance into the motor circuit. The reversing control 156 controls the polarity of applied electric energy to the motor and the braking control 158 operates to control the application of dynamic braking and/or plugging conditions to the motor windings and may also simultaneously operate a conventional hydraulic braking unit. The number and ratings of the batteries utilized in the vehicle establishes the maximum voltage that can be supplied to the motor circuit and in this manner determines the maximum speed that can be obtained in manual operation.

Included in the circuitry is provision for recharging the batteries when the vehicle is not in use by connecting it to a domestic electric supply through a charging circuit 234. Other self-contained sources of electricity or sources of motive power may be substituted where convenient, as indicated above. This compact vehicle, under manual operation, is easily maneuvered and parked and hence may be advantageously used for short trips of the nature frequently encountered in residential neighborhoods.

On commuting trips or trips of longer distances, the vehicle enters the rail system at an established entry point. When the vehicle engages an entry spur under the control of the operator, the vehicle is positioned so that the current collector mechanisms 62 engage the power supply conductors 26, 27. In one arrangement these power supply conductors are segmented and the voltage applied to them is under overall system control. In this manner the voltage supplied to the collector mechanism 62 for driving the car can be varied depending on the location of the conducting segments and the actual system conditions. When the vehicle establishes contact with the supply conductors an interlock mechanism is operated in the control circuitry 232 to automatically disconnect the self-contained power supply 60 and manual controls from the motor. Additional interlocked functions such as the locking of the doors and positioning of auxiliary stabilizing components may also be initiated in response to the establishment of system power in the vehicle.

The guide unit 66 may be raised either automatically or under the control of the operator to the upper or switching position depending on the type of control provided for that unit. For example, it is possible to incorporate sensors responsive to particular locations in the system to automatically position the guide unit. With such an arrangement all vehicle control while the vehicle is on the rail system is accomplished in response to system established criteria, either in response to passenger supplied information or independently thereof. In another arrangement a passenger may exercise control over the guide uint so that the vehicle may be switched off the main line at his option, for example. When the guide unit is established in proper position on the upper track unit 12 a second interlock in the control circuitry operates which permits transfer of system power to the drive motor in an operator controlled manner. Once this transfer to the system power is accomplished the vehicle is automatically propelled until it exits.

Under system control the vehicle is accelerated along the entry spur by increasing voltage applied in increments to the vehicle drive system as a function of the position of other vehicles on the main line so that the entering vehicle may be positioned on the main line in coordinated relation with other vehicles previously on that line. One form of entry control is diagrammatically illustrated in FIG. 24. On the main line 240 there are provided two sets of mechanically operated switches 242, 244, each switch being operated as a car passes it on that line. The launching area 38' of the entry spur 246 is energized only when a sufficient space is detected to permit acceleration of a vehicle along the entry spur into position on the main line. In order to accomplish this assume a vehicle is waiting on the entry spur 246 for entry onto the main line 240. As each vehicle passes the switch 242 the launching area section is de-energized until the main line vehicle passes switch 244. If no other vehicle has subsequently actuated switch 242, the launching area 38' becomes energized and accelerates the waiting vehicle along the entry spur 246 for entry onto the main line. If switch 242 had been actuated by a second vehicle before the first main line vehicle actuated switch 244, the entry spur would have remained de-energized. The spacing between switch points 242 and 244 controls the timing of vehicle entry onto the main line so that danger of collision is avoided without requiring that the main line vehicles be slowed down. Once an entering vehicle starts to be accelerated due to energization of the launching area 38' of the entry spur, that vehicle continues to be accelerated up to main line speed and enters at the detected available spot. The launching area of the spur line will remain energized as long as available space on the main line is detected by the switch arrangements 242, 244 so that more than one car may be successively accelerated into the main line where space is available. In this manner the vehicles are expeditiously accelerated and merged into the main line with other vehicles on that line.

Once a vehicle is on the main line, the guide unit is normally lowered to the running position and the vehicle is operated at a speed controlled by the system voltage applied via the segments 26, 27. The vehicles may operate on the main line at a constant speed, or if it is desired to run the vehicles in "trains" of closely spaced vehicles (see e.g. FIG. 1), each entering vehicle may be automatically accelerated at say ten m.p.h. faster than the system speed until it approaches the car immediately in front of it (the presence of the preceding car being detected by a proximity device or other suitable means) at which time it is automatically returned to system speed so that it runs in proximity with the vehicle immediately in front of it in train configuration.

When a vehicle approaches a spur at which exit is desired, the guide unit is raised (automatically or manually) before the car arrives at the junction in that upper level position the guide unit switches the car out of the main line onto the spur automatically. For example before 248 shown in FIG. 24 a switch actuator 250 is positioned. If the control is programmed to be actuated at that point the guide unit 66 will be raised. This automatic programmed control of exit sensing may be set into the car's control apparatus before it entered the system. Alternatively the guide unit may be under operator control. Due to the form of switch mechanism employed in the system it is possible to switch vehicles out of the closely spaced train configuration without affecting the overall speed of the other vehicles in any respect. When a vehicle enters an exit spur it is automatically decelerated, as by reduction of system voltage, automatic application of braking means such as plugging or dynamic braking (which can be initiated by mechanically actuated switches on the spur rail for example or by timers which operate in response to an exit spur signal when such an arrangement is employed).

A suitable electric circuit employing interlock relays 260, 262 is shown in FIG. 25. In the indicated circuit when the collector mechanism 62 engages power supply lines 26, 27, relay 260 is energized and operates contacts 260-1 (deenergizing the manual motor control circuitry), contacts 260-2 (energizing the the steering gear clutch 164 and applying power to operate control servos including the guide unit servo motor 122, centerboard servo motor 220, auxiliary equipment 264 such as door latch locks, and automatic braking control circuitry 266), and contacts 260-3 (connecting battery charger 234 to the system power source). When the guide unit 66 reaches its upper position it closes a circuit which energizes relay 262 to close a main power line control contacts 262-1 (allowing power to be supplied via the collector 62 to the motor 58) and a hold contact 262-2 (which provides a holding circuit bypassing the servo 122 so that relay 262 may remain energized independent of the position of the guide unit 66). Additional control switches indicated in the circuitry permit manual or automatic control operations for the several indicated components. For example, switch 268 enables the application of system power to the motor 58 to be manually controlled, switch 270 controls the raising and lowering of the guide unit while the vehicle is on the system and switch 272 may be operated by a cam on a spur as the vehicle is leaving the main line to decelerate the vehicle automatically.

Thus it will be seen that the invention provides improved vehicle and transportation system arrangements in which a vehicle drivable under manual control may be integrated into a high density transportation system for movement on that system under automatic control. Vehicle control is automatically transferred from manual control to automatic control when the vehicle enters the system and it is moved under overall system supervision within the transportation system. Switch arrangements are provided which enable the vehicle to enter or leave the system without affecting the overall speed of the other cars. The vehicles and transportation system of the invention facilitate parking arrangements such as a multilevel rail structure for example. With such structural arrangement manually controlled vehicles are left at the structure for automatic dispatch to parking storage locations and recall from those locations through a central control system without the necessity of an operator to control them. Such arrangements further require substantially less space than present types of automobile parking garages and permit large numbers of vehicles to be easily and quickly handled in an integrated manner due to uniformity of the vehicle size and configuration.

While a particular type of system has been described, employing an elevated structure, for example, it will be understood that drive surface may be at ground level with an adjacent control rail that cooperates with the vehicle guide unit, provided adequate protection against obstacles on the right of way can be assured. Various sizes of vehicles may be employed—it being possible that a two passenger vehicle may be most advantageous in commuter systems but larger bodies which accommodate ten passengers for example might also be constructed on basically the same chassis as the smaller types of passenger vehicles. Certain modifications of the specific disclosed mechanical arrangements are of course contemplated to be within the scope of the invention. For example in place of the steering shaft 85 connecting the guide unit to the steerable wheel 50 a hydraulic or an electrical link might be provided. Other types of propulsion arrangements may be employed under certain circumstances—for example, the external power may be supplied at a high voltage to a motor designed to operate at such a voltage and a supplemental prime mover such as a small internal combustion engine would be employed for propulsion off the controlled transportation system. In such an automatic propulsion system the electric drive might be in the form of a linear motor arrangement with flat parallel field coils adapted to receive a fixed rail functioning as an armature between them. In other arrangements air suspension techniques might be employed where travel at high speed is desired. Additions and modifications in the track system are contemplated such as the provision of several branches at each entrance or exit spur so that a greater number of vehicles may be accommodated. Therefore, while preferred embodiments of the invention have been shown and described it is not intended that the invention be limited to those disclosed embodiments or to details thereof and departures may be made therefrom within the spirit and scope of the invention as defined in the claims.

What is claimed is:

1. In combination, a transportation system having two separate lines and a junction between said lines, each said line including a generally horizontal drive surface of indeterminate length and guide means including a generally vertically disposed guide surface coextensive with each said line, the vertically disposed guide surfaces of said two lines being aligned with one another adjacent said junction, a vehicle adapted to engage said drive surface for movement therealong, and guide follower means carried by said vehicle adapted to engage said guide surfaces for providing directional control of said vehicle while said vehicle is on said transportaiton system comprising a vertically reciprocable guide follower unit and control means for moving said guide follower unit between a lower position in engagement with one of said guide surfaces and an upper position in engagement with the second of said guide surfaces.

2. The combination as claimed in claim 1 wherein each said guide means includes a pair of laterally spaced guide surfaces and said vertically reciprocable guide unit in operative position is disposed between said pair of guide surfaces in guided engagement with both surfaces of said pair.

3. The combination as claimed in claim 2 wherein said vehicle has a plurality of road wheels for engagement with said drive surface at least one of which is steerable, and means for coupling said vertically reciprocable guide follower unit to said steerable road wheel for controlling the directional movement of said vehicle along said transportation system.

4. The combination as claimed in claim 3 wherein said guide follower unit includes a first pair of guide follower rollers fixed in position and each adapted to engage an adjacent guide surface, and a second pair of guide follower rollers mounted for rotation as a unit about a generally vertical axis.

5. The combination as claimed in claim 2 and further including auxiliary stabilizing elements carried by said vehicle in laterally spaced relation to said guide follower unit for engaging the opposed outer surfaces of said guide means.

6. The combination as claimed in claim 5 wherein said vehicle has a plurality of road wheels for engagement with said drive surface at least one of which is steerable, said guide follower unit is mounted for rotation about a generally vertical axis as a function of the position of said pair of guide surfaces, means for coupling the rotation of said vertically reciprocable guide follower unit to said steerable road wheel for controlling the directional movement of said vehicle along said transportation system, and means for varying the position of said stabilizing elements as a function of the rotation of said guide follower unit.

7. The combination as claimed in claim 6 wherein said guide follower unit includes a first pair of guide follower rollers fixed in position and each adapted to engage an adjacent guide surface, and a second pair of guide follower rollers mounted for rotation as a unit about said generally vertical axis.

8. In combination with a transportation system having a vehicle support member of indeterminate length, a fixed guide member disposed above, parallel to, and coextensive with said support member, having a first generally vertical surface associated with a first line and a second generally vertical surface associated with a second line, said first and second surfaces being melded to form a single smooth surface twice the height of either said first or second surfaces, at the junction of said first and second lines, a vehicle adapted to be positioned between said support and guide members for movement along said transportation system, said vehicle including a plurality of wheels adapted to engage said vehicle support member, drive means connected to at least one of said wheels for rotating said wheel to propel said vehicle along said support member, and control means cooperating with said guide member for providing directional control while said vehicle is on said transportation system, said control means including a unit adapted to engage said guide member surface and being vertically reciprocable between a first position for engagement with the portion of said single surface corresponding to said first line and a second position for engagement with the portion of said single surface corresponding to said second line in the vicinity of the junction between said first and second lines.

9. The combination as claimed in claim 8 wherein said fixed guide member includes two spaced parallel rails, and said vertically reciprocable control unit is disposable between said parallel rails, and further including auxiliary stabilizing elements carried by said vehicle in laterally spaced relation to said control unit for engaging the outer surfaces of said parallel rails.

10. A vehicle comprising a body, four wheels rotatably mounted on said body and extending below said body and adapted to engage a drive surface, two of said wheels being aligned along the longitudinal center line of said body, one of said two aligned wheels being a steerable wheel and the other being a drive wheel, the other two of said wheels being lateral support wheels disposed on either side of said body outwardly from said longitudinal center line and between said front and rear wheels for providing lateral support, a steering structure mounted above said body, and means coupling said steering structure to said steerable wheel.

11. A transportation system comprising a line having a vehicle support rail unit of indeterminate length, said support rail unit having a generally horizontal drive surface, a coextensive guide rail unit disposed parallel to and above said support rail unit, said guide rail unit having a pair of spaced, generally vertical guide surfaces, energy supply means disposed adjacent said support and guide rail units; and a vehicle positionable between said support and guide rail units for movements along said line including a vehicle body, four wheels rotatably mounted on said body and extending below said body, two of said wheels being positioned in alignment along the longitudinal center line of said body for engagement with said drive surface, one of said two aligned wheels being a steerable wheel, the other being a driven wheel, the other two of said wheels being disposed outwardly from said longitudinal center line on either side thereof for providing lateral support, means engageable with said energy supply means for supplying power to said driven wheel, a steering structure mounted above said vehicle body for cooperation with said guide rail unit, said steering structure including follower members adapted to engage said vertical guide surfaces for positioning said steering structure in accordance with the configuration of said vertical guide surfaces, and means coupling said steering structure to said steerable wheel to position that wheel in accordance with the configuration of said vertical guide surfaces.

12. The transportation system as claimed in claim 11 wherein said system includes two separate lines and a junction between said separate lines, each line having a drive surface and a pair of guide surfaces associated therewith, the guide surfaces of the two lines adjacent said junction being disposed above one another to form a smooth continuous surface, and wherein said steering structure includes means for moving said follower members between a first position for engagement with the guide surface associated with one of said lines at said junction and a second position for engagement with the guide surfaces associated with the other of said lines at said junction.

13. The transportation system as claimed in claim 12 and further including a source of energy stored within said body, means for employing said energy source to rotate said driven wheel, passenger operated means for controlling the application of energy from said source to said driven wheel, passenger controlled steering mechanism coupled to said steerable wheel, and means responsive to the connection of said external source of energy to said vehicle via said engageable means to disable said vehicle body carried energy source employing means, said passenger operated control means and said passenger controlled steering mechanism.

14. A vehicle comprising a body, vertically reciprocable guide follower means supported on said vehicle body for selective engagement with two vertically aligned guide surfaces extending along a vehicle support surface comprising a plurality of rollers individually mounted for independent rotation about vertical axes, means supporting said rollers together for rotation as a unit relative to said vehicle, and means to shift said guide follower means to control the directional guidance of said vehicle along said support surface.

References Cited by the Examiner

UNITED STATES PATENTS

| | | | |
|---|---|---|---|
| 406,391 | 7/1889 | Dibble. | |
| 1,327,485 | 1/1920 | Lupton | 180—21 |
| 1,348,568 | 8/1920 | Kemble | 180—21 |
| 1,379,614 | 5/1921 | Bennington | 104—149 X |
| 1,716,004 | 6/1929 | Ridley | 104—119 |
| 2,125,590 | 8/1938 | Smallwood | 104—247 |
| 2,664,830 | 1/1954 | Kreibich | 104—247 |
| 2,982,227 | 5/1961 | Bishop et al. | 104—96 |
| 3,017,838 | 1/1962 | Bingham | 104—120 |
| 3,101,677 | 8/1963 | Ehinger | 104—91 |
| 3,118,392 | 1/1964 | Zimmerman | 104—88 |

ARTHUR L. LA POINT, *Primary Examiner.*

LEO QUACKENBUSH, *Examiner.*